July 22, 1930.  M. L. SINDEBAND ET AL  1,770,949
ART OF PROTECTING HIGH TENSION CIRCUITS
Filed Dec. 18, 1926
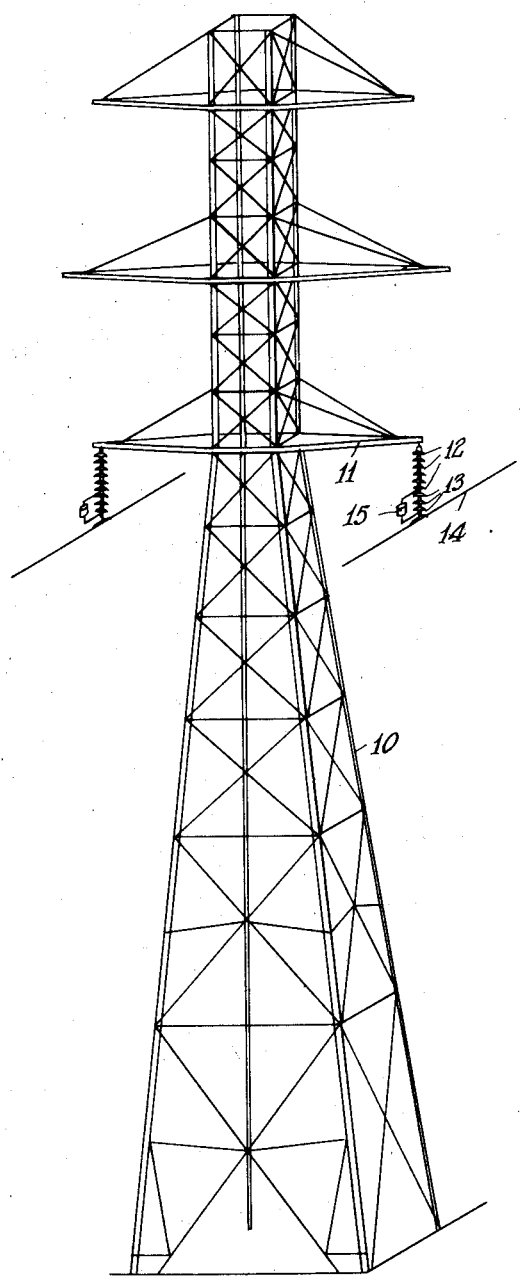
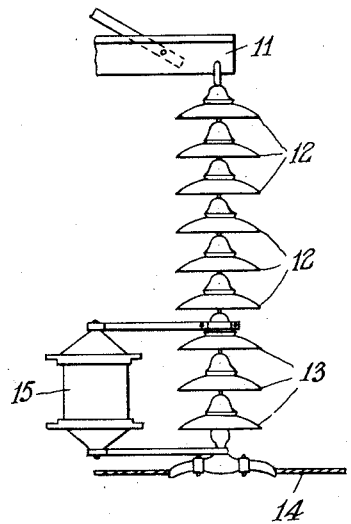
INVENTORS:
Maurice L. Sindeband
BY and Philip Sporn
ATTORNEY Patented July 22, 1930

1,770,949

UNITED STATES PATENT OFFICE

MAURICE L. SINDEBAND, OF NEW YORK, AND PHILIP SPORN, OF BROOKLYN, NEW YORK

ART OF PROTECTING HIGH-TENSION CIRCUITS

Application filed December 18, 1926. Serial No. 155,653.

The invention relates to alternating current high tension circuits, as transmission lines; and more particularly to a novel arrangement in connection with the suspension of such lines from the arm or like member of a suitable tower or other support, with a view to the protection of the lines from the effects of direct strokes of lightning or the temporary excess in voltages induced therein from lightning strokes within the vicinity of a circuit or a transmission line, or from any other transient impulses.

The invention has for its object a simple and inexpensive arrangement of insulating members and capacitance whereby, although a momentary lightning flashover may occur, the current of the line will be prevented from following.

The nature of the invention, however, will best be understood when described in connection with the accompanying drawings which set forth by way of example the particular embodiment hereinbefore noted, and in which drawings:

Fig. 1 is a fragmentary perspective view of a transmission line tower showing a power line suspended therefrom and arranged in accordance with the invention.

Fig. 2 is a fragmentary detail view of the connections and devices involved in the novel protective system.

Referring to the drawings, 10 designates a tower or other suitable line supporting member such as is commonly employed in connection with electrical transmission lines and having, for example, suitable arms 11, which may be of wood or steel, and intended to have secured thereto depending strings of insulating members as the primary suspension insulators 12 and secondary suspension insulators 13 by which is carried a conductor 14 of the transmission line. The particular character of the insulators as well as of the supporting towers or poles with arms or like members form no part of the present invention, the same being of any standard or special type and designed merely to carry the particular normal voltages prevailing in the line.

The lightning flashover of a string of insulators, such as the primary group of insulators 12, is a perfectly definite matter for a given type of assembly and for a lightning discharge having a definite steepness of wave front; and may be calculated in accordance with the characteristics of the line and insulator string. When an induced lightning voltage or direct stroke is established in the line equal to the lightning flashover of such string, a flash will then occur between the conductor 14 and the ground point or arm 11, thus breaking down the air insulation between the same. This establishes an ionized path through which the voltage of the power line may and usually does establish a current and flow to the ground. This results in a short-circuit or an arcing ground on a power system with consequent damage possible to the power conductor 14 as well as the string of insulators 12 and causing an interruption of the service.

It will be evident that by increasing the insulating value of the string of insulators 12, for example, by the addition of the secondary units 13, the value of such insulation might be made sufficient to prevent a flashover covering the distance of the combined strings of insulators, namely the primary group 12 and the secondary group 13, so that while a flashover could occur over the former group it would not be possible over the combined groups. It is also conceivable that the groups of insulators may be made large enough to prevent any lightning voltage, however large, from flashing the combined strings and therefore no trouble could be caused by the same on a power system. Such an arrangement, however, possesses the disadvantage of raising the insulating value of the transmission line as a whole to a degree such that it would allow the impressing of the lightning voltage to other equipment and apparatus connected to the line rather than permitting the lightning voltage to discharge itself by grounding through the arm 11 and tower 10. If it were attempted to correspondingly insulate such equipments also to a value equal to that of the line, it would become necessary to employ, even at moderate voltages, an insulation for said equipment such as would make the cost of power transmission prohibitive.

By the expedient herein proposed, it is possible to retain the advantage of the secondary string of insulators 13 without necessitating a corresponding increase in the general insulation of the remaining equipment of the line. To this end, there is arranged to be shunted across the secondary group or string of insulators 13 a capacitor member 15, of either a fixed or variable capacitance, the value chosen being such as to offer a very small capacity reactance to the flow of lightning current, which is an impulse discharge of very steep wave front. In this manner the lightning flashover insulation of the entire string—combined strings 12 and 13— will not be materially increased by the addition of the latter string. The reactance introduced by the capacitor member 15, however, will be sufficient to check the power current from flowing, it being understood that this current is usually of comparatively low frequency, say 25 to 60 cycles. This reactance thus introduced with respect to the power voltage will be a substantial increase over that offered by the string of insulators 12 alone; and the combination of the two strings of insulators is equivalent to the introduction of an additional reactance or insulation in the path of the power current of the rated potential.

Moreover, the bridging of the secondary string of insulators, which are in closest proximity to the power line, has the tendency to equalize the potential gradient of voltage distribution along the entire combined strings of insulators. This results in more uniform electrical stressing of the insulators 12 and 13 and therefore in an increase in their life.

We claim:

1. In high tension circuits including a supporting member and power conductor: a primary string of insulating members for suspending the conductor; a secondary string of insulators joined to the first string, the said power conductor being connected to the free end of the latter string and the free end of the former string being attached to the supporting member; and a lumped capacity reactance of appreciable value permanently connected across the secondary group of insulators at the place of suspension, said capacity being so related to said insulator strings as to provide a low impedance discharge path for transient impulses on the conductor while leaving the insulating value of said strings fully effective against discharge of power current from said conductor.

2. In high tension circuits including a supporting member and power conductor: the system of protecting the same against the effects of transient impulses, which comprises a primary string of insulating members for suspending the conductor; a secondary string of insulators joined to the first string, the said power conductor being connected to the free end of the latter string and the free end of the former string being attached to the supporting member; and a capacity reactance associated therewith of such value as to permit the free passage of a transient impulse but substantially impeding the flow of the power current.

3. In high tension circuits including a supporting member and power conductor: the system of protecting the same against the effects of lightning, which comprises a primary string of insulating members for suspending the conductor; a secondary string of insulators joined to the first string, the said power conductor being connected to the free end of the latter string and the free end of the former string being attached to the supporting member; and a lumped capacity reactance of appreciable value permanently connected across the secondary group of insulators at the place of suspension, the latter group of insulators having a different insulating value than the primary group, said capacity being so related to said insulator strings as to provide a low impedance discharge path for transient impulses on the conductor while leaving the insulating value of said strings fully effective against discharge of power current from said conductor.

4. In high tension circuits including a supporting member and a power conductor: the system of protecting the same against the effects of lightning and of the power current which would normally follow a lightning discharge from such power conductor to the supporting member, which comprises a primary string of insulating members for supporting the conductor and a secondary string of insulating members joined to the first string, the said power conductor being connected to the free end of the latter string and the other end of the former string being attached to the supporting member; and means associated with said strings to impede in conjunction therewith the flow of power current along the strings while offering negligible impedance to transient impulses.

5. In high tension circuits including a supporting member and power conductor: the system of protecting the same against the effects of lightning, which comprises a primary string of insulating members for supporting the conductor, and a secondary string of insulators joined to the first string, the said power conductor being connected to the free end of the latter string and the other end of the former string being attached to the supporting member and the secondary string being of such an insulating value as to materially increase the low frequency flashover voltage of the primary string; and a capacity reactance associated with said strings and of such a value as to leave substantially unchanged the lightning flashover value of the primary string by permitting the free passage of a lightning discharge but substantially impeding the flow of the power current.

6. In a high voltage electric power transmission system, a high voltage power conductor having a normal operating voltage, a support for said conductor, and insulating means for insulatingly holding said conductor on said support, said insulating means comprising a plurality of serially arranged insulators, and condenser means bridging at least some of said serially arranged insulators, said condenser means having a capacity value so related to the insulating value of said insulating means as to leave substantially fully effective the insulating effect of said insulating means against normal voltages but provide a low impedance discharge path for transient impulses while preventing power current from flowing in the path of the transient impulse discharges.

7. In a system of the character described, a plurality of serially connected electrical conductor elements exposed to a normal operating voltage and arranged so as to be subject to transient surge impulses, insulating means for each of said elements, said insulating means comprising a plurality of serially arranged insulating elements constituting two sections, one section having an insulating value safe to withstand the normal operating voltage but insufficient to withstand the action of surges, the other section having an insulating value sufficient to withstand in combination with the first section normal as well as abnormal practically occurring surge voltages, and by-pass means connected in shunt to the first-mentioned section and constituting a low impedance discharge path for transient surge impulses.

8. In a system of the character described, a plurality of serially connected electrical conductor elements exposed to a normal operating voltage and arranged so as to be subject to transient surge impulses, insulating means for each of said elements, said insulating means comprising a plurality of serially arranged insulating elements constituting two sections, one section having an insulating value safe to withstand the normal operating voltage but insufficient to withstand the action of surges, the other section having an insulating value sufficient to withstand in combination with the first section normal as well as abnormal practically occurring surge voltages, and condenser means connected in shunt to the first-mentioned section, said condenser means constituting a low impedance discharge path for transient surge impulses while leaving at all times effective the insulating value of the associated insulating section against discharges under normal operating voltage.

9. In a system of the character described, a plurality of serially connected electrical conductor elements exposed to a normal operating voltage and arranged so as to be subject to transient surge impulses, insulating means for insulatingly supporting said conductor elements, said insulating means comprising a plurality of serially arranged insulator elements and additional impedance means bridging at least some of said serially arranged insulator elements, said additional impedance means having an impedance characteristic so related to the insulating value of said insulating elements as to leave substantially fully effective the insulating effect of said insulating elements against normal voltages, but provide a low impedance discharge path for transient impulses while preventing power current from flowing in the path of the transient impulse discharges.

In testimony whereof we affix our signatures.

MAURICE L. SINDEBAND.
PHILIP SPORN.